United States Patent

Fick et al.

[11] Patent Number: 5,931,882
[45] Date of Patent: Aug. 3, 1999

[54] COMBINATION GRID RECIPE AND DEPTH CONTROL SYSTEM

[75] Inventors: Douglas L. Fick, Garretson; Kurt D. Gildemaster, Tea, both of S. Dak.

[73] Assignee: Raven Industries, Sioux Falls, S. Dak.

[21] Appl. No.: 08/883,423

[22] Filed: Jun. 26, 1997

Related U.S. Application Data

[63] Continuation-in-part of application No. 08/730,614, Oct. 21, 1996, which is a continuation-in-part of application No. 08/331,795, Oct. 31, 1994, abandoned, which is a continuation-in-part of application No. 08/098,621, Jul. 29, 1993, abandoned.

[51] Int. Cl.$^6$ .............................. G06G 7/76; E02F 3/76
[52] U.S. Cl. ........................... 701/50; 364/131; 364/138; 172/4; 172/4.5; 111/903; 239/1; 56/10.2 E
[58] Field of Search ........................... 701/50; 56/10.2 E, 56/DIG. 15; 364/131, 138, 528.38, 167.03, 167.11; 702/159, 97, 2; 239/1, 61, 63, 73, 161, 164, 168; 111/130, 200, 903; 172/4, 4.5, 176, 724, 316, 421, 430; 50/10.2 E, DIG. 15

[56] References Cited

U.S. PATENT DOCUMENTS

| Re. 35,100 | 11/1995 | Monson et al. | 111/130 |
|---|---|---|---|
| 4,413,685 | 11/1983 | Gremelspacher et al. | 172/316 |
| 4,414,792 | 11/1983 | Bettencourt et al. | 56/10.2 E |
| 4,507,910 | 4/1985 | Thornley et al. | 56/10.2 E |
| 4,573,124 | 2/1986 | Seiferling | 701/50 |
| 4,914,593 | 4/1990 | Middleton et al. | 701/50 |
| 4,918,608 | 4/1990 | Middleton et al. | 701/50 |
| 5,161,472 | 11/1992 | Handy | 111/73 |
| 5,184,293 | 2/1993 | Middleton et al. | 701/50 |
| 5,235,511 | 8/1993 | Middleton et al. | 701/50 |
| 5,260,875 | 11/1993 | Tofte et al. | 701/50 |
| 5,348,226 | 9/1994 | Heiniger et al. | 239/1 |
| 5,453,924 | 9/1995 | Monson et al. | 701/50 |

OTHER PUBLICATIONS

Brochure entitled "Senstek Brings You Ultra–Control", published by Senstek. Sep. 1989.

*Primary Examiner*—Jacques H. Louis-Jacques
*Attorney, Agent, or Firm*—Hill & Simpson

[57] ABSTRACT

A multi-product applicating system, seed planting system and control are provided for the dispensing of liquid or granular products in pre-selected amounts and planting seeds at pre-selected depths and frequencies. Three or more separate products can be dispensed simultaneously and constant control and monitoring of all products is provided for at the control console. Seed planting depth can also be continuously monitored. The present invention further provides a grid recipe system for creating a recipe which defines the amounts of each type of product to be applied to specific areas of the field and/or which defines a seed planting depths and frequencies for specific areas of the field. The grid recipe system utilizes the GPS and a data card having the recipe and/or seed depth/frequency stored thereon for controlling a computer which communicates with the control console of the present invention. The recipe and/or depth/frequency grid is created by the farmer based on personal knowledge and experience.

18 Claims, 7 Drawing Sheets

COMBINATION GRID RECIPE AND DEPTH CONTROL SYSTEM

CROSS-REFERENCE TO PATENT APPLICATION

The present application is a continuation-in-part of patent application Ser. No. 08/730,614, filed Oct. 21, 1996, which is a continuation-in-part of application Ser. No. 08/331,795, filed Oct. 31, 1994, now abandoned, which is a continuation-in-part of patent application Ser. No. 08/098,621 filed Jul. 29, 1993, now abandoned.

BACKGROUND OF THE INVENTION

The present invention relates to agricultural chemical dispensing systems and more particularly to a grid recipe and depth control system for agricultural chemical injection systems and planting systems utilized in agricultural environments.

In many agricultural applications it is necessary to inject or spray chemicals either onto the soil or onto the plants growing on the soil, such as fertilizers, herbicides, pesticides, fumigants, etc. The chemicals may be applied in liquid form or granular form. Typically what has been provided is a chemical container either in the form of a liquid tank or a granular bin in which the chemical is carried until it is metered out and dispensed through one or more spray nozzles carried on booms.

Raven Industries of Sioux Falls, South Dakota, the assignee of the present application, has previously sold a sprayer control system referred to as the SCS 440 in which a single chemical could be controlled to be dispensed at one of two pre-programmed flow rates and dispensed through up to six booms. Various data displays could be selected at the control console. A later control console known as the SCS 700 allowed for pre-programming one or two chemicals at a speed compensated application rate.

In addition, different amounts of multiple fertilizers, herbicides and other agricultural chemicals are desired in different areas of a field. The amount of a particular chemical to be applied is based upon the soil type, crop type, and weed infestation of a certain area of a field. The application of multiple fertilizers by use of a control system is disclosed in U.S. Pat. Nos. 4,630,773 and 5,220,876. However, the control systems disclosed in U.S. Pat. Nos. 4,630,773 and 5,220,876 require numerous hardware components and elaborate software or computer programs in order to implement the control systems with the pre-existing farm equipment. The elaborate and expensive control systems provided by U.S. Pat. Nos. 4,630,773 and 5,220,876 normally cannot be utilized by the individual farmer due to their high cost and, consequently, are almost exclusively purchase by large farming cooperatives and corporations.

While the control systems disclosed in U.S. Pat. Nos. 4,630,773 and 5,220,876 are accurate and enable substantially higher yields to be obtained, many individual farmers and small farming operations are desirous of obtaining a higher crop yield by improving current farming practices without incurring the expense of purchasing a control system similar to those disclosed in U.S. Pat. Nos. 4,630,773 and 5,220,876 and the difficulties encountered in retrofitting existing equipment to accommodate such systems. Simply put, the more expensive control systems, while providing adequate results, are simply too expensive to implement for the individual farmer or small farming operation.

Specifically, U.S. Pat. No. 5,220,876 is directed toward a variable rate fertilizer spreading apparatus and control system that utilizes detailed fertilizer maps and detailed on-board soil mapping systems that incorporate data obtained from analyzing the soil using soil analysis apparatus that is provided with the system. Thus, U.S. Pat. No. 5,220,876 discloses a fully automatic system in which manual overrides by the equipment operator is not desired, nor provided for. Similarly, U.S. Pat. No. 4,630,773 incorporates a digitized soil map which is generated from an aerial photograph of the field. The method disclosed by U.S. Pat. No. 4,630,773 also includes steps for testing the various soil types in the field and adjusting the fertilizer types accordingly.

However, as noted above, individual farmers and small farm operations such as family-owned farms are not desirous of such a sophisticated or such an expensive system. further, such elaborate and expensive systems are not necessary because individual farmers know from their experience over many seasons specifically which areas of their field may require more or less fertilizer or more or less herbicide. Specifically, by way of prior testing of the soil through years of farming his fields, a farmer is familiar with the different conditions in the field such as lower areas which accumulate water and, thus, have a greater weed infestation problem. The farmer is also familiar with other areas of the field where the soil is lacking nutrients and, consequently, additional fertilizer is required or where the planting depth needs to be adjusted.

The problem faced by these experienced individual farmers is how to convey this information to their equipment operators in an inexpensive and efficient manner without resorting to the elaborate systems discussed above. A solution to this problem would preferably involve reliance upon the farmers knowledge and experience and therefore would be a heuristic procedure. A solution to this problem would also preferably enable the farmer to input the data in the form of a grid recipe from a location remote from the field, i.e. from his home or office and which would eliminate entirely the requirement that a fertilizer and soil map or planting depth map be generated as required by the more expensive and elaborate prior art control systems.

It is, therefore, desirable to have a multiple chemical injection system for agriculture use which is capable of providing different amounts of multiple types of fertilizers or chemicals to be dispensed in different parts of a field whereby the amounts dispensed are determined and controlled by data generated by the farmer based on the farmer's personal knowledge and experience.

It is also known that proper seed placement or proper seed depth will maximize plant growth. Proper seed depth will depend upon the crop being planted as well as the soil and slope conditions for the field or grid. Specifically, in parts of a field that have excellent drainage, it may be preferable to plant seeds at a deeper depth than in parts of a field having poor drainage. Accordingly, there is a need for a planting system for agricultural use which is capable of planting seeds at different depths in different parts of a field.

Finally, there are circumstances where a farmer may desire to apply chemicals simultaneously with the planting of seeds in a field. As discussed above, the amount and rate of application of a chemical such as a fertilizer or insecticide to a field will vary and depend upon the different conditions in the field. Further, planting depth of seeds will also vary and depend upon the different conditions in a field. Accordingly, there is a need for a combination grid recipe and depth control system which simultaneously controls the rate of an application of a chemical such as a fertilizer or insecticide to a field depending upon the specific location and further that can vary the planting depth of seeds depending upon field location.

SUMMARY OF THE INVENTION

The present invention provides an improved control system for chemical application and/or for controlling seed depth in the agricultural area. In an embodiment, the control system of the present invention allows for the application of multiple products which may be fertilizers, herbicides, insecticides, fumigants, carriers, seeds or other similar materials. These materials can be applied in either liquid or granular form. The control system can operate either electric or hydraulic control valves or pumps for the various products.

The control system includes a visual display which displays various information relating to all five products simultaneously such as the rate of application for each product, the volume of each product applied, the amount remaining in each product tank, etc. Other information is also available to be displayed on the control panel including current speed, field area covered, etc. Thus, the number of products handled is greatly increased, the information display is greatly increased and the product dispensing capabilities are greatly increased.

The present invention further provides a grid recipe system having a data card which contains a desired recipe for zoned areas of a field defined by longitude and latitude and the amounts of the multiple products desired to be dispensed over these particular areas. The term "recipe" is intended to encompass a chemical recipe such as fertilizer and/or insecticide amounts and dispense rates as well as seed planting depths and frequencies. The control system utilizes a Global Positioning System (GPS) to provide the location (longitude and latitude) of the product applicator. Further, the data card provides a medium which can store data received from the control system for further processing by a computer.

Further, the present invention provides an improved boom height control system which incorporates sonic sensing equipment which measures the height of the boom relative to the ground so that the height of the boom may be more accurately adjusted and the planting depth may be more accurately controlled. The sonic sensing equipment of the present invention may also be utilized to adjust the height of the boom for slopes and other irregularities when dispensing insecticides or fertilizers in addition to planting depth control.

In addition, the computer performs two main functions. The first function is to output to the control system the recipe that is defined for the particular gridded zone. Second, the computer stores information transmitted by the control system into defined files. Thus, the present invention cooperatively combines the grid recipe system with the control system. The resulting grid recipe control system (GRCS) is capable of controlling the application of the liquid and/or granular products at a programmed rate and the applicator rate is controlled relative to the width and speed of the applicator. The GRCS determines in which gridded area the applicator is located and by using this location (which is determined by the GPS), the recipe is downloaded from the data card to the control system to provide the proper application of multiple products to a particular gridded zone or to control the height of the boom for planting depth control in the field based upon the grid recipe created by a farmer as discussed below.

The data card provides an electronic media storage device that contains the desired recipe information which is defined by the farmer. The recipe is delineated by the latitude and longitude in all the zoned areas of the field. The farmer creates the recipe by establishing a grid for the field to be fertilized. The farmer also determines the locations in the field requiring different amounts of different products based upon various factors such as the soil type, the weed infestation and the crop type. Thus, a gridded field is used to make a "checker board" of the field in which the farmer may determine how much of each product to apply in each square of the checker board. Because the farmer is familiar with his soil type in his field by prior testing of the soil and years of farming, the creation of the grid recipe is greatly simplified. No aerial photographs are required; no digitized soil maps are needed; no testing and analysis of soil samples is necessary. The method is heuristic in its approach and depends upon the farmer's personal knowledge of the field and its characteristics. For example, the farmer is also familiar with different conditions in the field such as low areas which accumulate water and, thus, have a greater weed infestation problem. Further, the farmer is also familiar with other areas that are lacking in nutrients in the soil, etc. In addition, the farmer plans which type of crop to plant and can base the product needs upon such information.

Also, when the farmer is planting crops, the farmer can create a planting depth grid recipe based upon prior knowledge of the different conditions in the field. Sensor blocks in the form of ultrasonic transducers are mounted onto the planter and transmit pulses toward the ground. The pulses are then reflected from the ground back toward the transducers. The boom height is then calculated based upon the time it takes for a transmitted signal to be received back at the transducer.

In an embodiment, an electronic picture of the ground is produced which compensates for the existence of foreign matter such as straw and rocks on the ground surface.

In an embodiment, the height of the boom for the planter is controlled hydraulically.

In an embodiment, the present invention provides a method for generating a planting depth and frequency grid recipe for planting a crop in a field and varying the seed depth and planting frequency according to the specific location in the field. The method includes the step of dividing the field into a plurality of sections, creating a plurality of seed control depth/frequency pairs, at least one seed control depth/frequency pair corresponding to each section of the field, storing the depth/frequency pairs in a mobile data storage means, delivering the data storage means to a data processing means located at the seed depth/frequency control system, communicating the location of the seed depth/frequency control system to the data processing means and controlling the seed depth/frequency control system based upon the location of the seed depth/frequency control system and the depth/frequency pair pertaining to the section of the field encompassing the location of the seed depth/frequency control system.

In an embodiment, the method of the present invention also provides a product application system for agricultural use which includes at least one reservoir for holding seeds to be dispensed, at least one dispensing applicator having a defined width for planting seeds, a conduit means for directing seeds from the reservoir to the applicator, a valve for controlling the flow of the seeds from the reservoir to the dispensing applicator, a depth control means for controlling the height of the dispensing applicator and the planting depth of the seeds, a programmable control means for controlling the valve means and the depth control means, a display means for displaying seed planting depth location, a location sensing means for determining a location of the dispensing applicator and for communicating said location to the programmable control means, a data storage means for storing a plurality of planting depths and frequencies, at least one planting depth and frequency corresponding to each section of the field and a computer means for processing the planting depth and frequency obtained from the data storage means and for communicating with the programmable control means to provide the planting depth and frequency corresponding to the section of the field to the programmable control means.

In an embodiment, the present invention provides a control means for a seed planting system which includes a programmable control means for controlling the frequency and depth at which seeds are planted, a display means for displaying information relating to the depth at which the seeds are being planted and which includes a continuous display of actual current seed planting depth and frequency, a location sensing means for determining the location of the seed planting system and for communicating the location to the programmable control means, a data storage means for storing a planting depth and frequency for each section of the field and a computer means for processing said planting depth and frequency obtained from the data storage means and for communicating the planting depth and frequency to the programmable control means.

In an embodiment, the present invention provides a method of generating a grid recipe for both chemical application and planting depth and frequency for a field and simultaneously applying at least one chemical and planting at least one crop in the field using the grid recipe. The method includes the steps of dividing the field into a plurality of sections, creating a plurality of chemical application/seed depth sets for simultaneously applying at least one chemical at a predetermined rate and planting at least one crop in at least one section of the field at a predetermined depth and frequency and identifying the section or sections of the field to which each chemical application/seed depth set pertains. The method further includes the steps of storing the chemical application/seed depth sets in a mobile data storage means, delivering the data storage means to a data processing means located at the chemical application/seed depth control system, communicating the location of the chemical application/seed depth control system to the data processing means, and controlling the chemical application/seed depth control system based upon the location of the system and the chemical application/seed depth set pertaining to the section encompassing the location.

In an embodiment, the present invention also provides a product application system for agricultural use that includes at least one seed reservoir, at least one chemical reservoir and at least one combination chemical and seed dispensing applicator. The system also includes a seed conduit for directing seeds from the seed reservoir to the dispensing applicator and a chemical conduit for directing the chemical from the chemical reservoir to the applicator. The system further includes valve means for controlling both the flow of seeds and chemical and a depth control means for controlling the height of the dispensing applicator and the planting depth of the seeds. The system further includes a programmable control means for controlling the seed valve means, the chemical valve means and the depth control means as well as the display means for displaying seed planting depth information and chemical application information. The system also includes location sensing means for determining the location of the applicator and for communicating the location to the programmable control means. The system further includes a data storage means for storing a plurality of chemical application rates, planting depths and planting frequencies and information relating to a pre-selected application rate, planting depth and planting frequency corresponding to each section of the field. Finally, the system includes a computer for processing the chemical application rate, planting depth and frequency obtained from the data storage means for each section of the field and communicating said information to the programmable control means to control the planting depth and frequency and chemical application flowrate in each section of the field.

As a result of the farmer's knowledge, it is possible for the farmer to create the grid recipe desired in the farmer's home or office. The farmer does not have to be in the field to do this. For example, the farmer can generate the grid recipe in his office on a home computer. The farmer can then transfer this information onto the data card which stores data. The data card is also capable of storing data which is received by the computer in the grid recipe system and the information received from the control system via the computer for further processing.

DETAILED DESCRIPTION OF THE PREFERRED EMBODIMENTS

Figure 1:
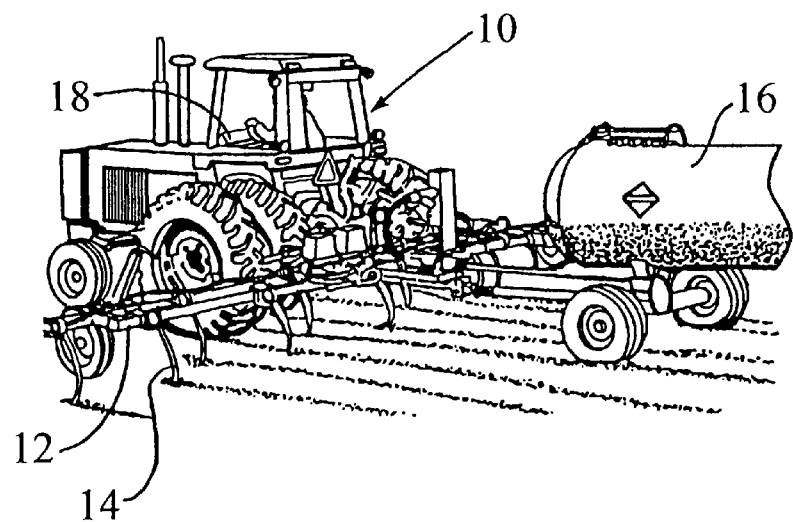
FIG. 1 illustrates a chemical dispensing vehicle which can be utilized in combination with the present invention.

In FIG. 1 there is illustrated an agricultural vehicle such as a tractor generally at 10. The vehicle 10 may be provided with one or more booms 12 carrying spray or injection conduits 14 through which liquid, granular materials or seeds may be dispersed. The vehicle 10 is provided with one or more storage reservoirs 16 for holding the products to be dispensed. The sensors 15 are disposed on the boom 12 and are used in connection with boom leveling and controlling seed depth. The reservoirs or hoppers 16 may be contained on separate vehicles and towed like a trailer, or can be incorporated into the vehicle itself in the form of tanks or bins. Carried within the drivers compartment is a console 18 through which control of the dispensing system can be made.

Figure 2:
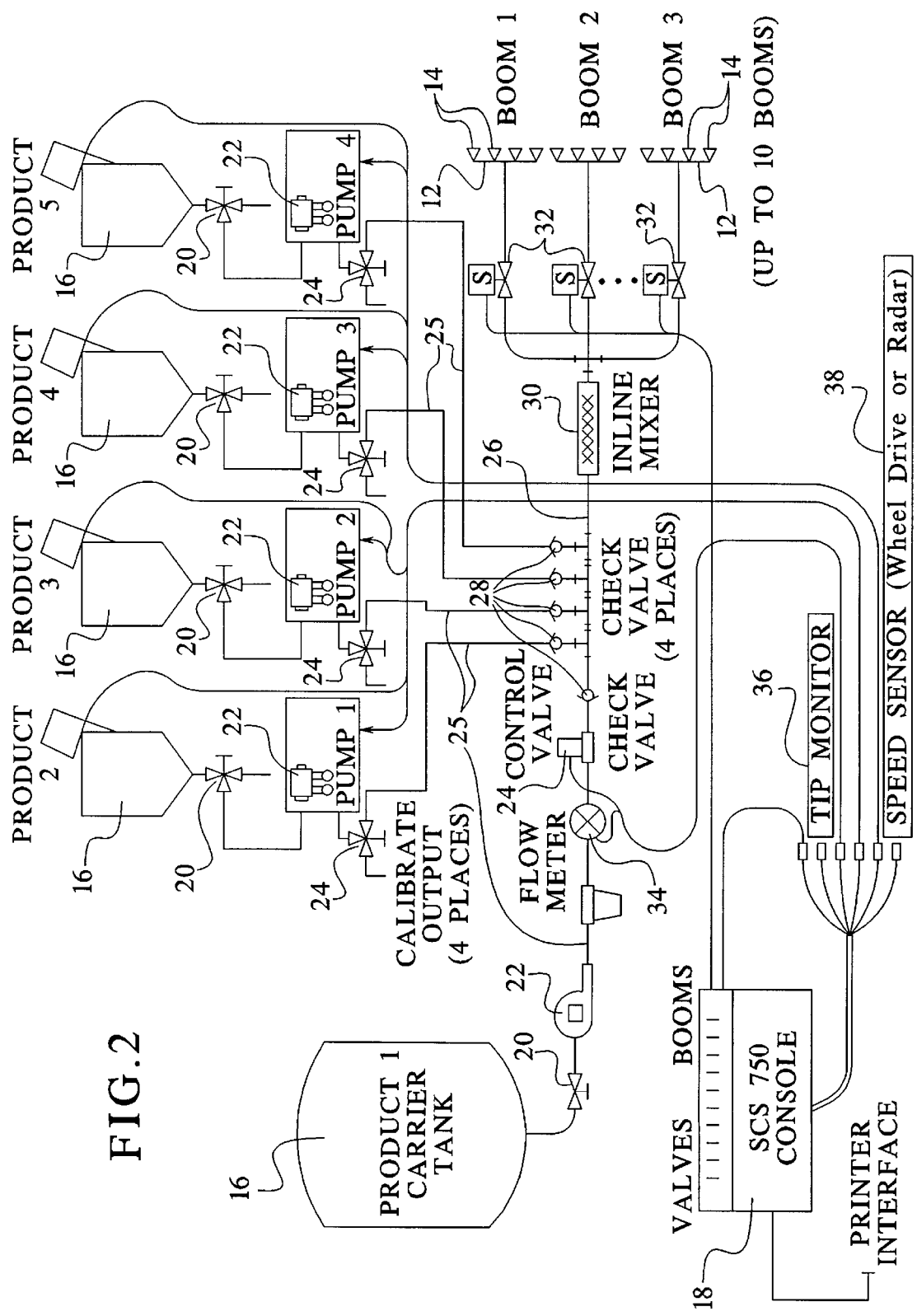
FIG. 2 is a schematic diagram illustrating the various components of the chemical injection system of the present invention.

The dispensing system is shown in greater detail in FIG. 2 where five separate product containers 16 are illustrated. In the system shown, up to five different types of products can be applied simultaneously. The schematic diagram illustrates that each of the product containers 16 has a controllable output valve 20 leading to a pump 22 which in turn has a controllable output valve 24. The five output flows are then connected by conduits 25 to a single manifold 26 after passing through check valves 28. An in line mixing device 30 may be used to assure that all of the products are thoroughly mixed and from the mixing device the flow is directed out through controlled valves 32 to the booms 12 and dispensing nozzles 14.

The system control is operated through the console 18 to provide the appropriate control to the various valves and pumps and to receive information from various sensors. Sensors such as a flow meter 34, a dispensing tip monitor 36 and a vehicle speed sensor 38 can be used.

Figure 3:
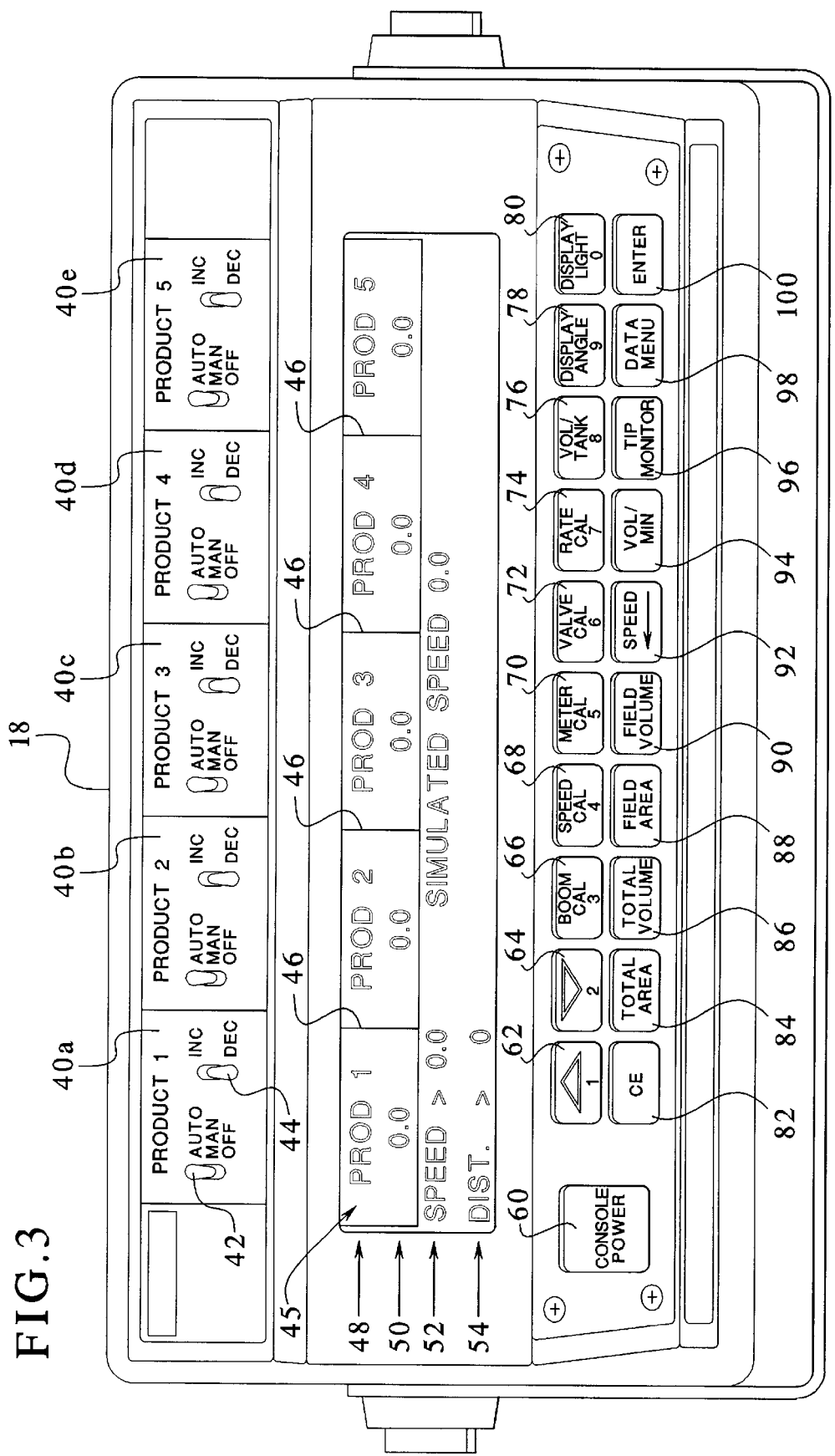
FIG. 3 is an elevational view of the control panel for the chemical injection system of the present invention.

The console 18 is shown in greater detail in FIG. 3. Along the top edge of the console are five switch areas 40a, 40b, 40c, 40d and 40e relating to each of the five products to be dispensed. Each of the switch areas has a first switch 42 for controlling a product dispensing mode, whether that is an automatic mode, a manual mode or off. Also, each area has a second switch 44 for increasing or decreasing the dispensing rate of product when the first switch 42 is in the manual mode.

Below the switch areas is a display screen 45, preferably a liquid crystal display, which, as shown, provides at least four lines of display information. The display is divided into five lateral sections by vertical bars 46 so that information relating to each of the five products can be displayed simultaneously. A top line 48 of the information identifies each of the five product categories. A second line 50 displays specific information relating to each of the five products such as a continuous display of the actual current rate of application of each product. The third line 52 and fourth line 54 display various information as selected by operation of the selector switches positioned below the display.

A first switch 60 is utilized to turn on or turn off the console power. Switch 62, in one mode, is used to move a position cursor to the right, and in a second mode to input the numeral 1. Switch 64 operates in a first mode to move the position cursor to the left and in a second mode to input the numeral 2.

Switch 66 is used in a first mode to enter in boom widths and in a second mode to enter the numeral 3. Thus, by utilizing switch 66 the width of each boom, in inches or centimeters can be input into the console memory for up to ten booms. Key 68 is used in a first mode to enter in wheel size for calculating speed when using a wheel drive speed sensor and in a second mode to enter the numeral 4. By using switch 68 the wheel drive speed sensor can be calibrated to provide appropriate speed input signals when utilizing such a wheel drive speed sensor. Such sensors are known and utilize hall effect switches, magnetic switches or other similar arrangements on a non-driven wheel such that the number of rotations are counted and, given the diameter of the wheel, distance and thus speed can be calculated and displayed.

Switch 70 is used to enter meter calibration constants in a first mode and in a second mode to enter the numeral 5. By utilizing switch 70 the flow meter may be calibrated to provide accurate flow information of product being dispensed. Switch 72 is used to control the valve system response time in a first mode and in a second mode to enter the numeral 6. By utilizing switch 72 the valve control and/or pump control can be modified.

Switch 74 is used in a first mode to input the rate of production application for each product and in a second mode to enter the numeral 7. By utilizing switch 74 a target application rate can be input for each of the products.

Switch 76 is used in a first mode to display the remaining chemical amounts in each tank in a first mode and to enter the numeral 8 in a second mode. Switch 78 is used in a first mode to adjust contrast of the display for better viewing and in a second mode to enter the numeral 9. Switch 80 is used in a first mode to turn on a display light for night viewing and in a second mode to enter the numeral 0.

Switch 82 is used to clear an entry to delete any unwanted input. Switch 84 is used to display the total area to which each of the products has been applied. Switch 86 is used to display the total volume of product which has been applied for each of the five products.

Switch 88 is used to display the volume of each product which has been applied to a current field. Switch 90 is used to display the volume of each product which has been applied to the current field.

Switch 92 is used to display vehicle speed and distance and also allows for entry of a self test speed. Switch 94 displays the volume per minute for each product.

Switch 96 is used to display tip faults at each spray tip to designate if any tips are clogged, and thus not spraying. Switch 98 is used to display data not accessible from the keyboard and switch 100 is used to enter data into the console.

The console 18, upon initial powering up, will display various area units of measurement, such as U.S. acres, International System units (Hectares) or a turf unit of 1,000 square feet. By utilizing switches 62 and 64 the cursor can be moved to highlight an appropriate unit of measurement and switch 100 can be used to enter that desired unit for future display purposes.

Next, a speed sensor type is to be selected which can be either magnetic sensors, sonar, speedometer input, drive shaft input or radar input. Again switches 62 and 64 can be used to move the cursor to highlight the appropriate speed sensor type and switch 100 can be used to enter that for calculations and display.

For each of switches 70, 72 and 74, a five step programming method must be undertaken for each of the products to be dispensed. First, the appropriate key 70–74 is depressed. Then the arrow keys 62 and 64 are used to position the cursor over the appropriate area into which data is to be entered. Then switch 100 is depressed to signify that the appropriate area has been selected. This causes switches 62–80 to move into the second mode to allow for numeric input. Once the appropriate numerals have been entered (also utilizing switch 82 to erase any improper entries) switch 100 is again depressed to enter that number into the area highlighted by the cursor.

Figure 4:
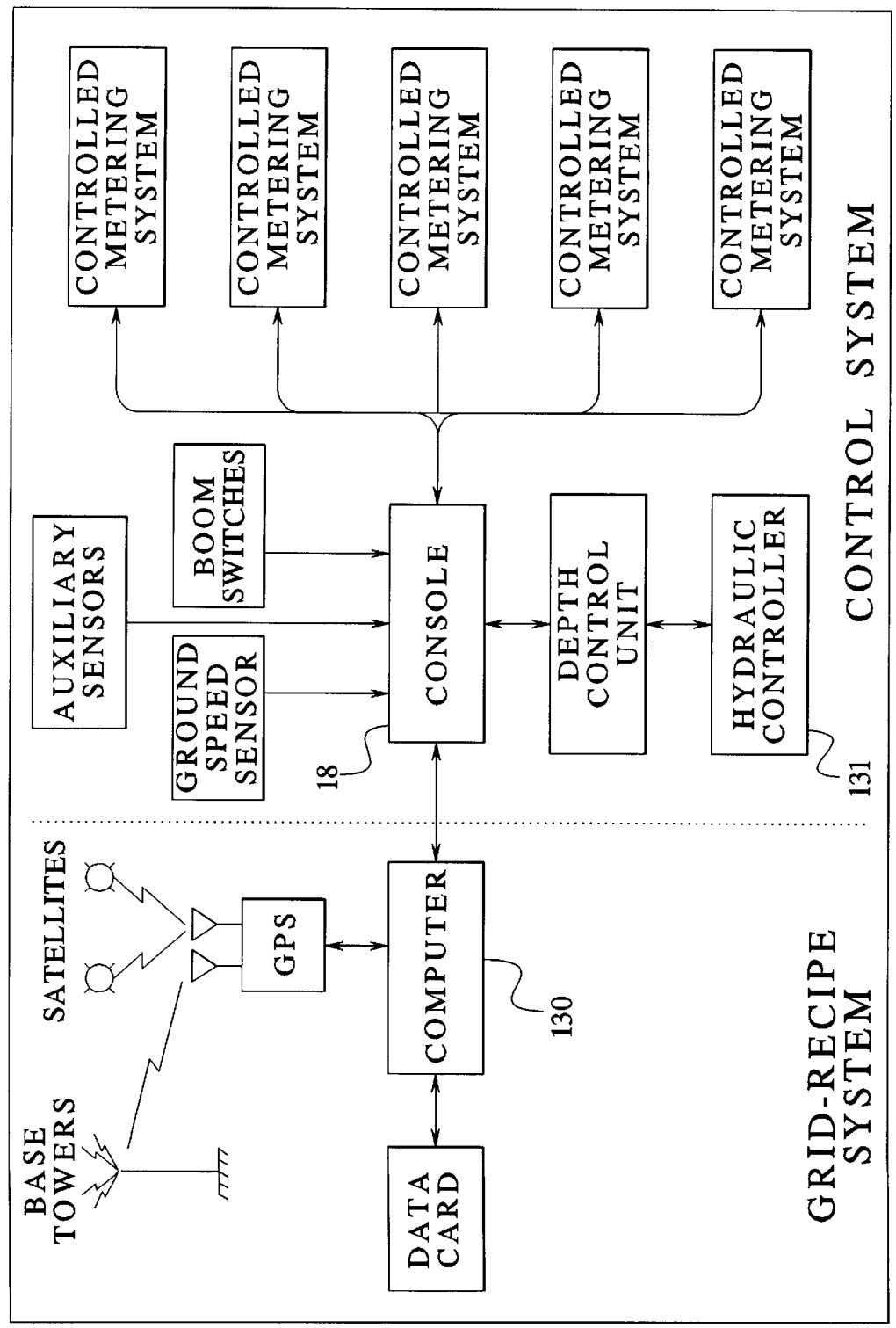
FIG. 4 is a block diagram illustrating the various components of the system of the present invention.

The above description of the control system and its components is further defined by the overall system block diagram illustrated in FIG. 4. For example, an interface between a Grid Recipe System (GRS) and the control system is shown.

Figure 9:
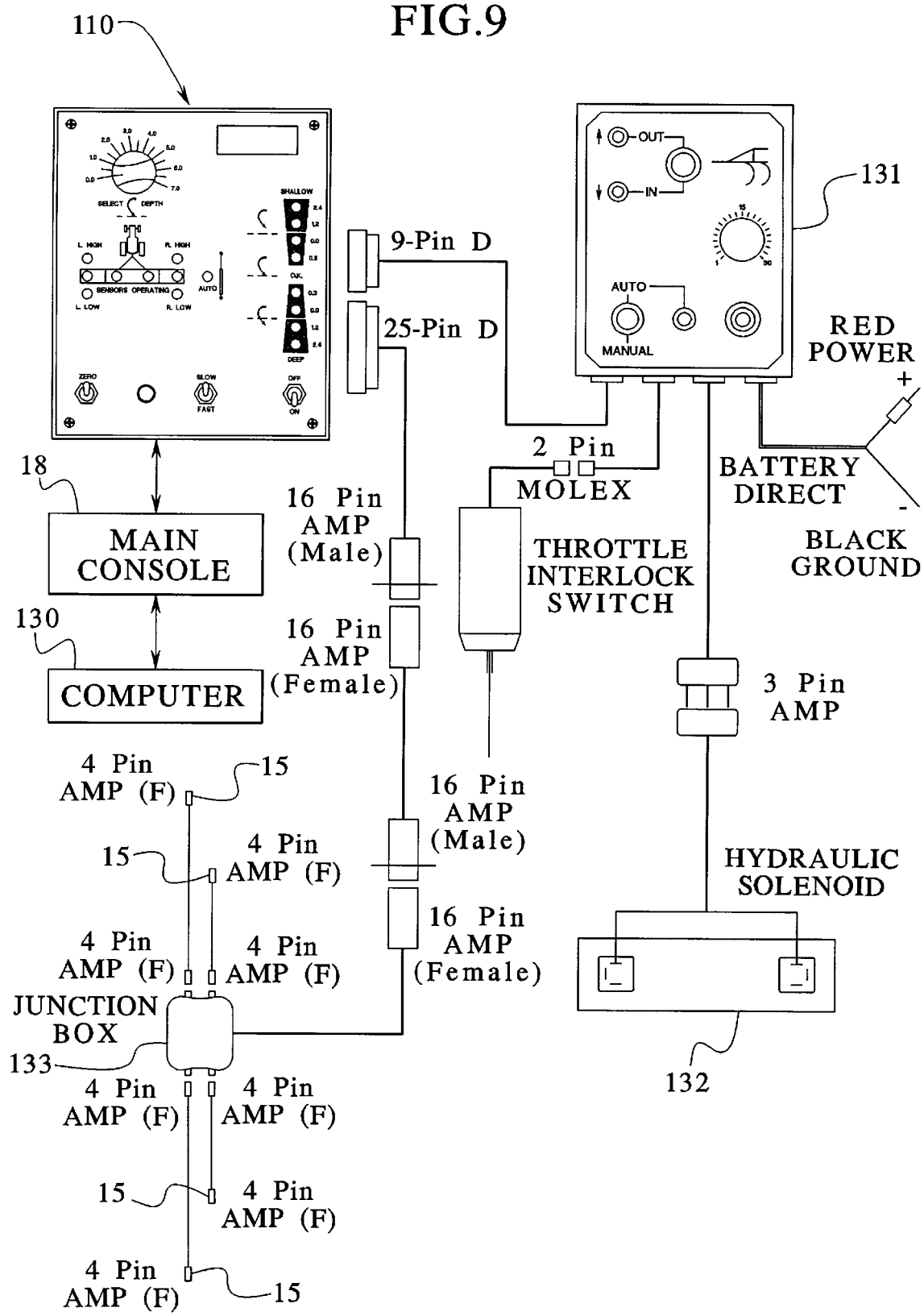
FIG. 9 is a schematic diagram illustrating the various components of the seed depth control system of the present invention.

The control system described above is shown on the right half of FIG. 4. The blocks shown include the multiple controlled metering systems. Five such systems are illustrated in FIG. 4. The controlled metering system may be mechanically, electrically or hydraulically driven. The planting depth control unit may be driven mechanically, electrically or hydraulically. As seen in FIGS. 4 and 9, the preferred planting depth control unit is controlled hydraulically. The rate of application is controlled by varying the speed or restricting the output of the delivery system. The volumetric output of the metering system is converted to a pulse train that can be recognized by the console. The controlled metering systems are connected to and communicate with the console.

The console consists of a display to present data to the operator. The console also has a keyboard by which the operator can recall specific data, enter system parameters or program the console to gather specific data. Switches, as described above, are also provided to activate the controlled metering systems. In addition, microprocessors that control the application rate of the products are provided.

Boom switches are also connected to the console. The boom switches control the flow/no-flow to the boom sections. The stage of the switches is monitored to determine the width of the applicator (i.e., the greater the number of boom switches in the flow position, the greater the width of the applicator area). In addition, a ground speed sensor is connected to the console. The ground speed sensor converts distance to a pulse that is recognized by the console.

In addition, auxiliary sensors are provided as inputs to the console which monitor parameters that are critical to proper functioning of the applicator such as: system pressure, product level, critical connections, etc. Thus, the right half side of FIG. 4 illustrates the control system of the present invention.

Figure 5:
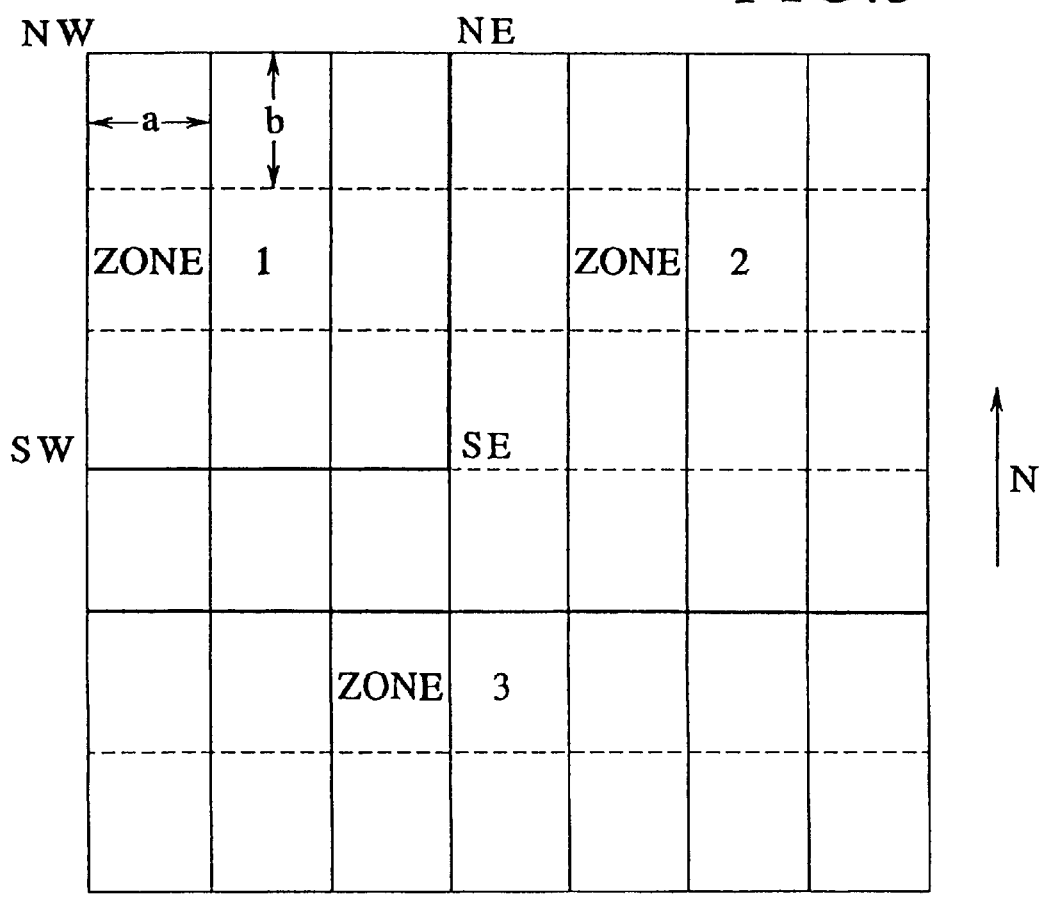
FIG. 5 is a schematic diagram illustrating the gridded field as could be used in the present invention.

The left half side of FIG. 4 consists of the grid recipe system (GRS) which has a computer that utilizes GPS. The GPS uses satellites and a base tower to determine the locations of specific areas in the gridded field. For example, the field is laid out in latitude and longitude coordinates so that zones may be created in the field by the farmer to delineate different regions of the field that need different applications of different products. An example of a gridded field is illustrated in FIG. 5.

In addition, the computer performs two main functions. The first function is to output the recipe in the form of an insecticide/fertilizer recipe or a seed plant depth recipe that is defined for the particular gridded zone to the control system. Second, the computer stores information transmitted by the control system into defined files. Thus, the present invention cooperatively combines the grid recipe system with the control system. The resulting grid recipe control system (GRCS) is capable of controlling the application of the liquid and/or granular products and/or seeds at a programmed rate and depth. The applicator rate is controlled relative to the width and speed of the applicator. The grid recipe system determines in which gridded area the applicator is located and by using this location (which is determined by the GPS), the recipe is downloaded from the data card to the control system to provide the proper application of multiple products to a particular gridded zone in the field based upon the grid recipe created by the farmer.

Also shown in FIG. 4 is a data card. The data card is an electronic media storage device that contains the desired recipe information which is defined by the farmer. The recipe is delineated by the latitude and longitude in all the zoned areas of the field. Thus, a gridded field is used to make a "checkerboard" of the field in which the farmer may determine how much of each product to apply or at what depth the seeds are to be planted in each square of the checkerboard.

The farmer is familiar with his soil type in his field by prior testing of the soil and years of farming. In addition, the farmer is familiar with different conditions in the field such as low areas which accumulate water and, thus, have a greater weed infestation problem and other areas that are lacking in nutrients in the soil, etc. The farmer is also familiar with the crop to be planted and at what depth and can base the product needs and planting depths upon such information.

As a result, it is possible for the farmer to create the grid recipe desired at home or at the office. The farmer does not have to be in the field to do this. Instead, the farmer can generate the grid recipe in the office on a personal computer, for example. The farmer can then transfer this information onto the data card which stores the data defining the grid recipe. The data card is also capable of storing data which is received by the computer in the grid recipe system and the information received from the control system via the computer for further processing. Thus, the recipe is a listing of the application rates desired for the multiple products to be applied in the defined zones of the gridded field.

As mentioned above, FIG. 5 illustrates a gridded field. The field is delineated by latitude and longitude so that zones may be created for use with a desired grid recipe. The zone consists of one or more squares, for example, or units. The squares or units preferably have a width dimension that is a multiple of the boom width to simplify the method of the invention. For example, the unit shown in FIG. 5 has a width "a" and a length "b". The zones need not be regular geometric shapes however. For example, zone 1 is shown as a 3×3 square and zone 3 is a 2×7 rectangle whereas zone 2 has an irregular shape. The type of product and the application rate for each different type of product is set in the grid recipe for each zone.

For example, with reference to FIG. 5, if a farmer begins at the northwest corner (NW) of the field shown in zone 1, the present invention would dispense known amounts of the various products or plant seeds at defined depths as defined in the grid recipe for zone 1. For example, product 1 may have a dispensing rate of 10 or a desired planting depth of 1.2 inches, product 2 may have a dispensing rate of 0, product 3 may have a dispensing rate of 100, or a desired planting depth of 1.6 inches. Then, as the farmer proceeds south through three units of zone 1 until reaching the southwest corner (SW) of zone 1, the grid recipe for zone 1 is dispensed. Upon coming to the southwest corner (SW) of zone 1 which borders zone 2, the recipe changes to that of the grid recipe for zone 2. The zone 2 grid recipe has product application rates for the products or a planting depth which vary from those of the grid recipe for zone 1. In addition, after proceeding through one unit of zone 2 the southward-bound farmer proceeds into zone 3. As a result, the present invention will convert to the application rates for each of the products or the planting depth for the grid recipe for zone 3, and these amounts or planting depth will be dispensed in the two remaining units of zone 3 before the farmer reverses direction of the vehicle and proceeds north up the second column of units of the gridded field. This process continues until the entire field has been covered by the various grid recipes of products or pre-selected planting depths. Thus, the control system and the grid recipe work together to provide the different product application rates for different products in each of the zones traveled by vehicle.

Figure 6:
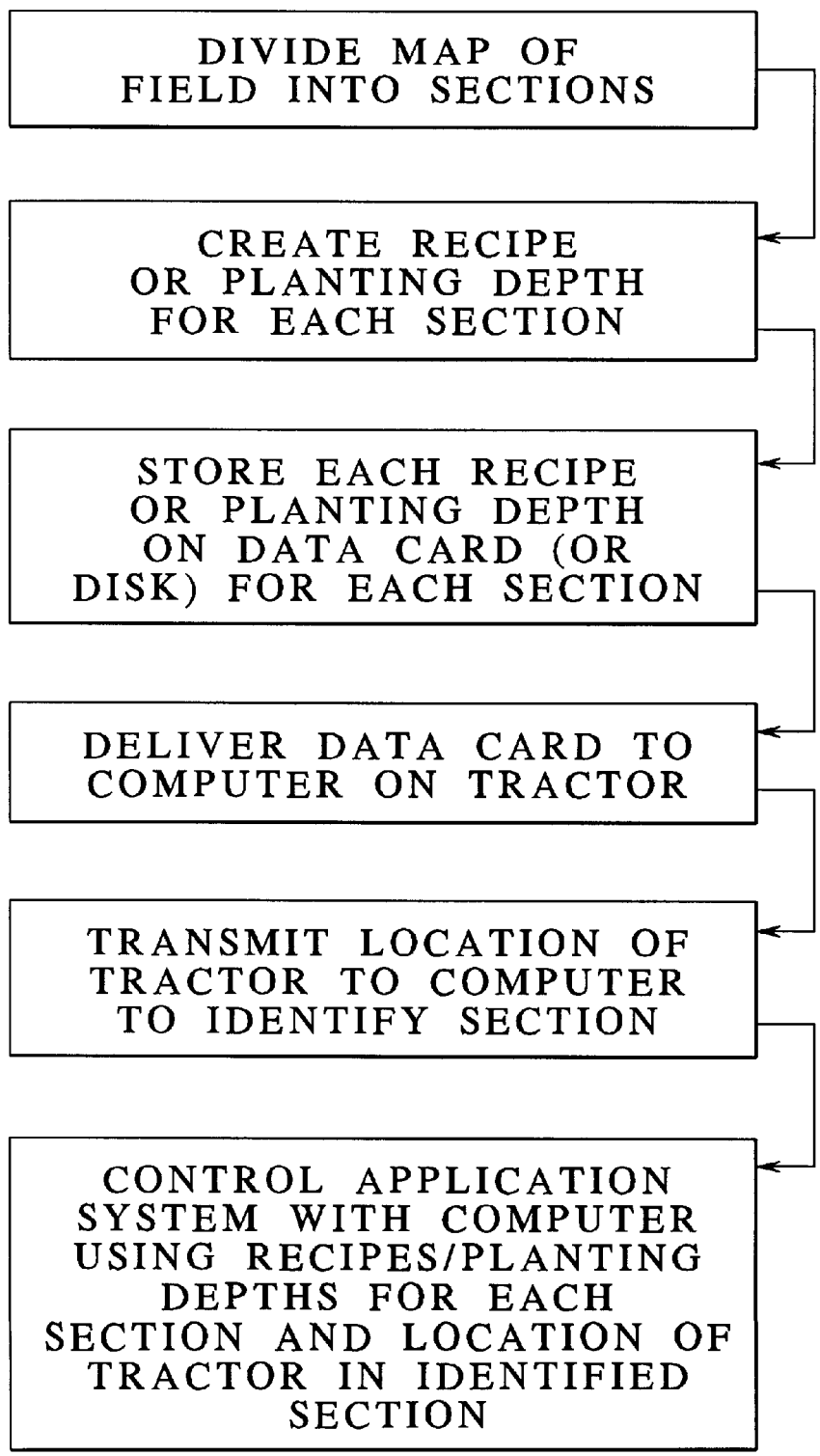
FIG. 6 is a flow diagram illustrating a method of generating and using a grid recipe for chemical application in accordance with the present invention.

The method of generating a grid recipe and using said grid recipe is illustrated in FIG. 6. First, as shown at the top of FIG. 6, the farmer divides the field into a plurality of sections. The farmer may use a pre-existing survey or pre-existing map of the field to do this. Generally, an aerial photograph is not required unless a pre-existing map or survey is unavailable. After dividing the field into a plurality of sections, the farmer generates a prescribed recipe or planting depth for each section. In most cases, the farmer already knows what and how much to apply or the planting depth for the specific crop for each particular section based on personal experience. The recipe can cover one or more chemical applications. The farmer then stores all of the recipes and/or planting depths on a data card, diskette or other portable data storage means which enables the farmer to deliver the data to the on-board computer of the tractor. As opposed to physically delivering the data card or disk to the tractor, it is foreseeable that such data could be transmitted by way of radio waves or other suitable transmission means. After the data has been delivered to the tractor and communicated to the computer, the tractor is ready to go out into the field and apply the recipes to the sections of the field. During this process, the location of the tractor is transmitted to the computer by way of the GPS system discussed above. Accordingly, the location of the tractor, i.e. which section the tractor is in, is constantly communicated to the computer so that the computer will communicate the proper recipe and/or planting depth to the application system. Thus, two sets of information are used by the controller to control the application system. Specifically, the controller uses the recipe and/or planting depth for each section which is transmitted to the computer by way of the data card, and the computer uses the location of the tractor to identify the section which the tractor is in. When the tractor moves from one section to another which has a different recipe than the previous section, the computer then alters the recipe and/or planting depth which is being applied by the application system.

Figure 7:
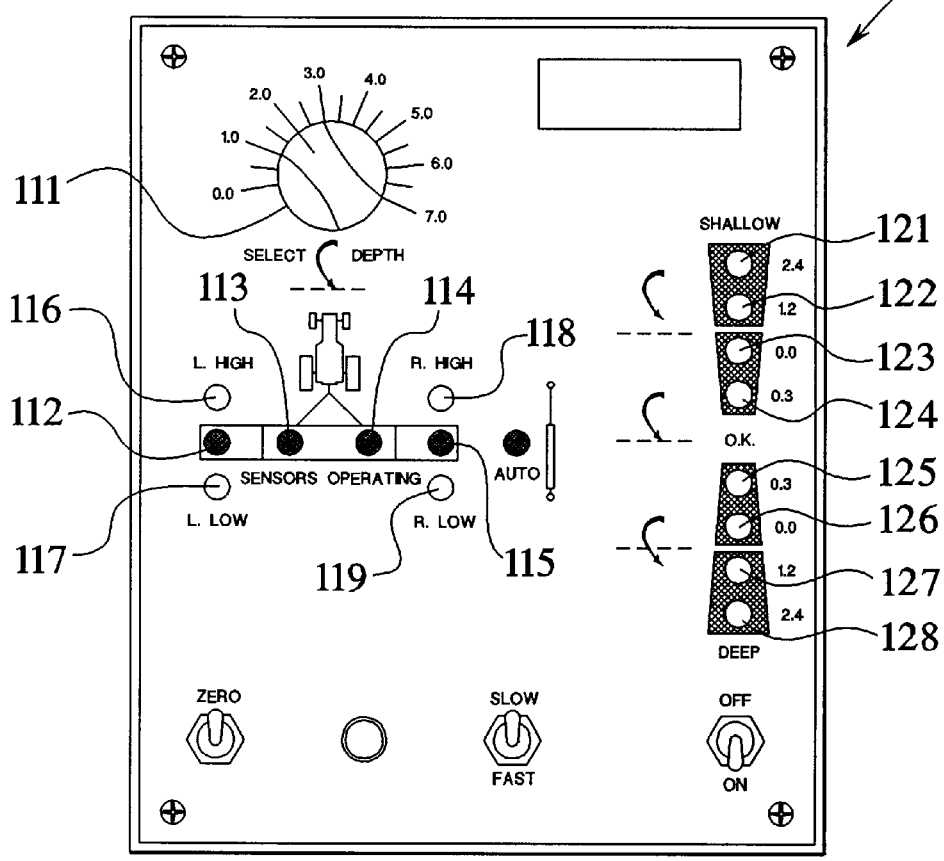
FIG. 7 is an elevational view of the depth control panel for the seed planting system of the present invention.

Referring now to FIG. 7, a separate console 110 is shown for the planting depth control function of the present invention. Of course, the features of the console 110 can be combined with the features of the console 18 (FIG. 3) if the system employed is capable of applying chemicals and planting seeds simultaneously. A manual depth selection switch 111 is shown along the top edge of the console 110. However, the depth control may also be selected by the farmer when generating a grid recipe as discussed above. In the embodiment illustrated in FIG. 7, four sensors 15 are disposed on the boom 12 (see FIG. 1) and each sensor is represented by a light 112, 113, 114 or 115. The lights 116, 117, 118 and 119 represent the relative position of the left side and right side of the boom 12 respectively. Specifically, if the left side of the boom 12 is raised, the light 116 will flash. If the left side of the boom 12 is lowered, the light 117 will flash. Similarly, if the right side of the boom 12 is raised, the light 118 will flash and if the right side of the boom 12 is lowered, the light 119 will flash. Lights 121–128 indicate a relative planting depth. Specifically, when none of the lights are flashing, the pre-selected planting depth is obtained. However, if the light 121 is flashing, the depth is 2.4 inches too shallow and if the light 128 is flashing, the depth is 2.4 inches too deep.

Figure 8:
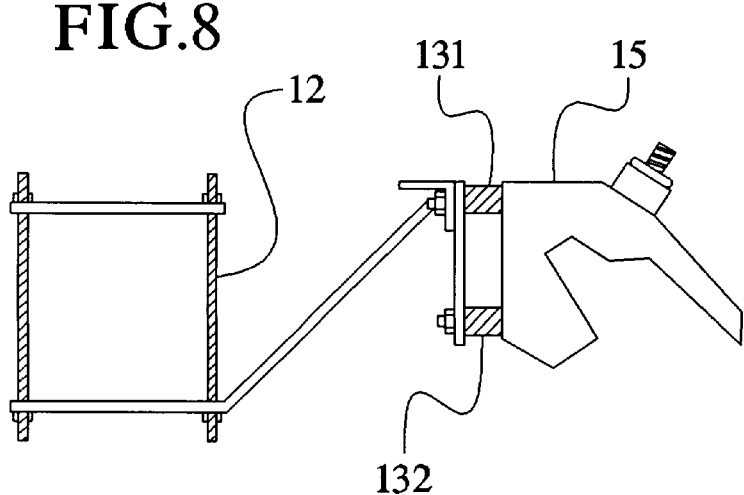
FIG. 8 is a side elevational view of a sensor mounted onto the boom which is used to control boom height and seed depth in accordance with the present invention.

Turning to FIG. 8, a sensor 15 as mounted onto the boom 12 is illustrated. Preferably, the sensor 15 is mounted using rubber mounts 131, 132. When all of the sensors 115 are operating correctly, each of the lights 112, 113, 114 and 115 (see FIG. 7) will be lit.

Turning to FIG. 9, the control panel 110 is linked to the main console 18 and computer 130 (see also FIG. 4). Further, the console 110 is also linked to the hydraulic controller 131. The controller in turn raises and lowers the boom 12 (see FIG. 1) with the hydraulic solenoid shown at 132. Feedback from the sensors 15 is received at the console 110 through the junction box 133.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

I claim as my invention:

1. A method for generating a planting depth/frequency grid recipe and planting at least one crop in a field using the planting depth/frequency grid recipe utilizing a data processing means and a seed depth/frequency control system transported by a vehicle through the field, the seed depth/frequency control system including a seed applicator having a defined width, the method comprising the steps of:

dividing a field into a plurality of sections, each of the sections having a width equal to a multiple of the defined width of the product applicator;

creating a plurality of seed control depth/frequency pairs for planting at least one crop in at least one section of the field at a predetermined depth and at a predetermined frequency and identifying the section or sections to which each of said depth/frequency pairs pertains;

storing the depth/frequency pairs in a mobile data storage means;

delivering the stored depth/frequency pairs to a data processing means located at the seed depth/frequency control system, the data processing means for communicating the depth/frequency pairs to the seed depth/frequency control system;

communicating the location of the seed depth/frequency control system to the data processing means; and controlling the seed depth/frequency control system based upon the location of the seed depth/frequency control system and the depth/frequency pair pertaining to the section encompassing the location, the seed depth being controlled.

2. The method of claim 1 wherein the step of dividing the field into a plurality of sections is conducted at a location remote from the field.

3. The method of claim 2 wherein the step of creating a plurality of recipes is conducted at a location remote from the field.

4. The method of claim 3 wherein the step of creating a plurality of seed depth/frequency pairs is conducted using only personal knowledge of a farmer.

5. A product application system for agricultural use comprising:

at least one reservoir for holding seeds to be dispensed;

at least one dispensing applicator having a defined width;

conduit means for directing seeds from said reservoir to said dispensing applicator;

valve means in said conduit means for simultaneously controlling a flow of said seeds from said reservoir to said dispensing applicator;

hydraulic depth control means for controlling the height of the dispensing applicator and the planting depth of the seeds;

programmable control means for controlling said valve means and said depth control means;

display means for displaying seed planting depth information;

location sensing means for determining a location of said dispensing applicator and for communicating said location to said programmable control means;

data storage means for storing a plurality of planting depths and frequencies, said field divided into a plurality of sections, the date storage means including at least one planting depth and frequency per section, each section having a width equal to a multiple of said defined width of said at least one dispensing applicator; and computer means for processing said planting depth and frequency obtained from said data storage means and for communicating with said programmable control means to provide said planting depth and frequency at said locations of sections in a field.

6. A product application system according to claim 5, wherein said at least one dispensing applicator comprises more than six booms carrying dispensing applicators.

7. A product application system according to claim 5, wherein said valve means are controllable electrically.

8. A product application system according to claim 5, wherein said valve means are controllable hydraulically.

9. A product application system according to claim 5, wherein said display means includes a continuous display of the actual current planting depth in addition to other information.

10. A control means for a seed planting system having at least one reservoir of seeds to be planted through conduits at frequencies controlled by valves at depths controlled by a boom leveler, the seed planting system having a defined width, the control means comprising:

programmable control means for controlling the frequency and the depth at which the seeds are planted;

display means for displaying information relating to the depth at which the seeds are being planted;

said display means including a continuous display of the actual current seed planting depth and frequency;

location sensing means for determining a location of said seed planting system and for communicating said location to said programmable control means;

data storage means for storing a planting depth and frequency for units of a field on which said seeds are to be planted, said field being divided into a plurality of units, each unit having a width equal to a multiple of said defined width of said seed planting system; and computer means for processing and said planting depth and frequency obtained from said data storage means and for communicating with said programmable control means to provide said planting depth and frequency at said units of the field.

11. A control means according to claim 10, wherein said display means includes a liquid crystal display having at least three lines of information.

12. A control means according to claim 11, wherein said planting depth and frequency for each is continuously displayed as one of said at least three lines of information.

13. A method for generating a grid recipe for chemical application and planting depth for a field and simultaneously applying at least one chemical and planting at least one crop in the field using the grid recipe by utilizing a data processing means and a chemical application/seed depth control system transported by a vehicle through the field, the chemical application/seed depth control system including a chemical/seed applicator having a defined width, the method comprising the steps of:

dividing a field into a plurality of sections, each of the sections having a width equal to a multiple of the defined width of the product applicator;

creating a plurality of chemical application/seed depth sets for simultaneously applying at least one chemical at a predetermined rate and planting at least one type of seed in at least one section of the field at a predetermined depth and frequency and identifying the section or sections to which each of said chemical application/seed depth sets pertains;

storing the chemical application/seed depth sets in a mobile data storage means;

delivering the data storage means to a data processing means located at the chemical application/seed depth control system, the data processing means for communicating the chemical application/seed depth sets to the chemical application/seed depth control system;

communicating the location of the chemical application/seed depth control system to the data processing means; and controlling the chemical application/seed depth control system based upon the location of the chemical application/seed depth control system and the chemical application/seed depth set pertaining to the section encompassing the location.

14. The method of claim 13 wherein the step of dividing the field into a plurality of sections is conducted at a location remote from the field.

15. The method of claim 14 wherein the step of creating a plurality of recipes is conducted at a location remote from the field.

16. The method of claim 15 wherein the step of creating a plurality of chemical application/seed depth sets is conducted using only personal knowledge of a farmer.

17. A product application system for agricultural use comprising:

at least one seed reservoir for holding seeds to be dispensed;

at least one chemical reservoir for holding at least one chemical to be dispensed;

at least one combination chemical and seed dispensing applicator having a defined width;

seed conduit means for directing seeds simultaneously from said seed reservoir to said dispensing applicator;

chemical conduit means for directing said chemical simultaneously from said chemical reservoir to said dispensing applicator;

seed valve means in said conduit means for simultaneously controlling a flow of said seeds from said seed reservoir to said dispensing applicator;

chemical valve means in said conduit means for simultaneously controlling a flow of said chemical from said chemical reservoir to said dispensing applicator;

hydraulic depth control means for controlling the height of the dispensing applicator and the planting depth of the seeds;

programmable control means for controlling said seed valve means, said chemical valve means and said depth control means;

display means for displaying seed planting depth information and chemical application information;

location sensing means for determining a location of said at least one dispensing applicator and for communicating said location to said programmable control means;

data storage means for storing a plurality of chemical application rates, planting depths and planting frequencies, said field divided into a plurality of sections, the date storage means including at least one chemical application rate, seed planting depth and seed planting frequency per section, each section having a width equal to a multiple of said defined width of said at least one dispensing applicator; and computer means for processing said chemical application rate, planting depth and frequency obtained from said data storage means and for communicating with said programmable control means to provide said chemical application flowrate, planting depth and frequency at said locations of sections in a field.

18. A control means for a combination seed planting and chemical applicator system having at least one reservoir of seeds to be planted through conduits at frequencies controlled by valves at depths controlled by a boom leveler and at least one reservoir of at least one chemical to be dispensed through conduits at flowrates controlled by valves, the combination seed planting and chemical applicator system having a defined width, the control means comprising:

programmable control means for controlling the frequency and the depth at which the seeds are planted and the flowrate at which the chemical is to be dispensed;

display means for displaying information relating to the seeds and chemical simultaneously;

said display means including a continuous display of the actual current seed planting depth and frequency and chemical application flowrate;

location sensing means for determining a location of the combination seed planting and chemical applicator system and for communicating said location to said programmable control means;

data storage means for storing a planting depth and frequency and chemical application flowrate for units of a field on which said seeds are to be planted and said chemical is to be applied, said field divided into a plurality of units, each unit having a width equal to a multiple of said defined width of said seed planting system; and computer means for processing and said planting depth and frequency and chemical application flowrate obtained from said data storage means and for communicating with said programmable control means to provide said planting depth and frequency and chemical flowrate at said units of the field.

* * * * *